Oct. 13, 1925.  1,557,152
W. FRITSCHE
MULTIPLE EXPOSURE CAMERA
Filed March 31, 1920    2 Sheets-Sheet 1
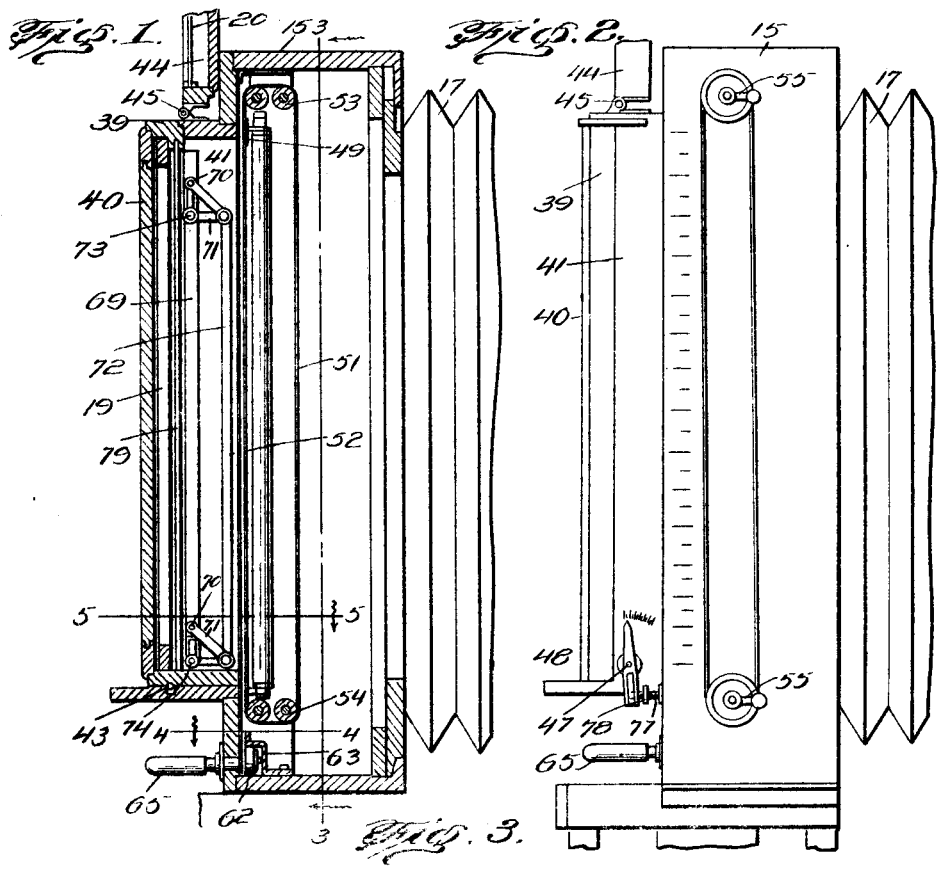
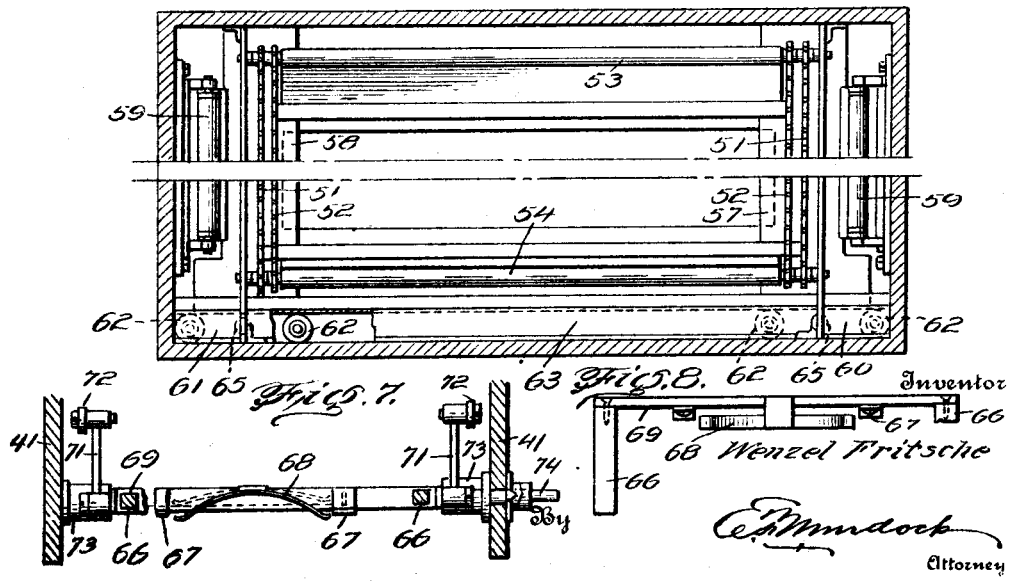
Inventor
Wenzel Fritsche
Attorney

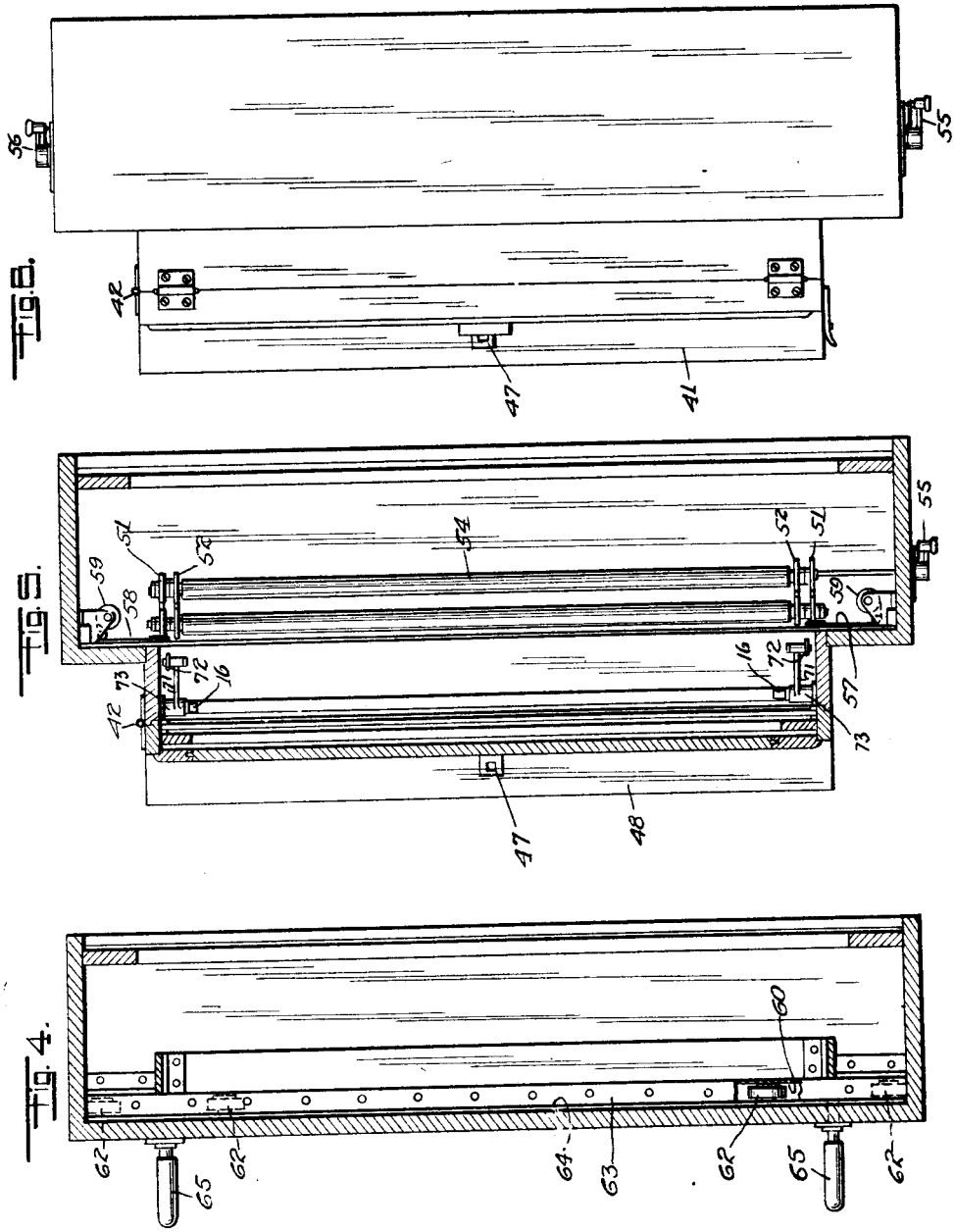

Patented Oct. 13, 1925.

1,557,152

UNITED STATES PATENT OFFICE.

WENZEL FRITSCHE, OF NEW YORK, N. Y.

MULTIPLE-EXPOSURE CAMERA.

Application filed March 31, 1920. Serial No. 370,117.

*To all whom it may concern:*

Be it known that I, WENZEL FRITSCHE, a citizen of Germany, and a resident of the city of New York, in the county and State of New York, have invented certain new and useful Improvements in Multiple-Exposure Cameras, of which the following is a full, clear, and exact description.

Among the principal objects which the present invention has in view are: To facilitate the placement of a photographic image on the sensitized plate of a camera; to accelerate the operation of arranging the camera for exposing various areas of the sensitized plate; to adapt the ground glass holder and plate holder to co-operate to vary the arrangement of the screen; and to permit an attendant performing the various operations to accomplish the objects above mentioned from the same station.

*Drawings.*

Figure 1 shows a vertical longitudinal section of a camera constructed and arranged in accordance with the present invention;

Figure 2 is a side elevation of the same;

Figure 3 is a cross section, the section being taken as on the line 3—3 in Figure 1;

Figure 4 is a horizontal section of the rear frame of a camera, the section being taken as on the line 4—4 in Figure 1;

Figure 5 is a horizontal section of the same frame, the section being taken at a different height in the said frame, and as on the line 5—5 in Figure 1;

Figure 6 is a top plan view of the same;

Figure 7 is a detail view on enlarged scale, showing as a horizontal section the screen-holding frame;

Figure 8 is a front view of the same.

*Description.*

The herein disclosed camera is preferably used in conjunction with an apparatus for automatically focusing multiple exposure cameras, an application for patent on which was filed by me in the United States Patent Office under date of the 11th day of March, 1920, bearing Serial No. 364,909, to which application cross reference is here made; the purpose of which is, briefly, to dispose the plate frame 15 in proper focal relation to the lens frame. These two frames, when mounted on the apparatus mentioned, are moved toward and away from each other to expand the bellows 17, the mechanism for accomplishing the same functioning automatically and with reference to a copy board wherein is disposed the object to be photographed. A number of objects may be placed on the copy board, and in various locations thereon.

The plate 19 is suitably mounted in the holder 39, the holder 39 being provided with an air-tight back 40, and being hinged on the extension 41 by vertical hinges 42, to swing in a horizontal plane, as seen best in Figures 5 and 6 of the drawings. It is held in closed position by spring-seated detents 43, as seen best in Figure 1 of the drawings.

As is usual in photographic cameras, the plate holder and the ground glass holder 44 occupy the same working position. The ground glass holder 44 is arranged to swing upward, to rest in a vertical position above the extension 41, when the plate holder 39 is swung in a horizontal plane into its working position. To this end the ground glass holder 44 has spring-opening hinges 45, which normally maintain the raised position of the said ground glass plate holder. In the lowered position of the ground glass plate holder, it is locked by any suitable means, preferably by means of the latch 46, which engages the striker plate 47, in the small platform 48 of the extension 41.

When operating a camera of the character disclosed, a number of areas of the sensitized plate 19 are exposed for the production of a photographic image. To this end the camera lens head 18 is shifted, for varying the operating or focal axis of the lenses in the head. The areas on the plate 19 to be exposed also vary to suit the design of the operator. The operator is aided and guided by the ground glass 20 and the image produced thereon, when setting or focusing the camera.

The areas referred to are controlled by curtains 49 and 50, the defining edges of which are moved vertically by endless chains 51 and 52. The chains 51 and 52 are independently operated by shafts 53 and 54, and by the cranks 55 and 56 connected therewith. Fixedly mounted on the shaft 54 are sprocket wheels, which engage the chains 51, while sprocket wheels on the shaft 53 drive the chains 52. The other sprocket wheels with which the said chains engage are idlers; the object of the construction and arrangement being to permit the movement of one of the curtains 49 or 50 without affecting the other of said curtains. As shown best in Figure 1 of the drawings, the curtains are moved in the same plane so that the edges could, if desired, be drawn together. Between these edges the rays of light projected from the head 18 must pass to the plate 19, thus limiting and defining the exposed area on the plate 19 between horizontal boundaries. The vertical boundaries of the exposed areas are formed by the rigid plates 57 and 58, and the flexible curtains connected therewith, which are normally wound upon spring-actuated, vertically disposed rollers 59.

As seen best in Figure 3 of the drawings, the plates 57, 58, are mounted on trucks 60 and 61. The bodies of the trucks 60, 61, are supported by small rollers 62, within a narrow guide channel, formed by an angular strip 63, the upper extension of which is removed from the side wall of the frame 15 to form a narrow guide slot 64 for the said plates 57, 58. The trucks 60 and 61 are moved independently and laterally by exposed handles 65, each of which is connected with one of the said trucks.

From the foregoing it is obvious that as the operator moves the plates 57 and 58, employing for that purpose the handles 65, the vertical boundaries of the exposed area of the plate 19 are obtained. The plates 57 and 58 have curtains connected therewith, and the curtains 49 and 50 have a sliding engagement, or, in other words, move in contact with one another, so as to prevent the passage of light therebetween. Thus, by controlling the curtains 49 and 50, and the plates 57 and 58, different areas of the plate 19 may be blocked out, and exposed to suit the desire of the operator.

Cameras of the character disclosed are largely employed in making photographs for so-called half-tone work. These photographs are made by employing a screen or lined member for dividing the light into small beams. These beams are more or less sharply defined as the screen is moved to and from the plate. To this end a frame 66 is furnished, having clips 67 and springs 68, for pressing the said screens against the said clips, for steadying the plates in operation. The frames 66 are supported in guides 69, which are channeled members, supported pivotally by pins 70, in bell cranks 71, disposed at the upper and lower sections of the extension. The bell cranks 71 at the opposite sides of the extension 41 are operatively connected by the link bars 72. The bell cranks 71 are pivotally mounted by studs 73 and the shaft 74. As shown in Figure 2 of the drawings, the shaft 74 extends beyond the side of the extension 41 and is provided with an indicator 75, the end whereof rides over a calibrated scale, for showing the extent of the rotation of said shaft. To assist in the movement of the indicator 75, and to provide a micrometic feed therefor, a screw 77, and a nut 78, are operatively connected to the indicator 75, to rotate the shaft 74.

It is obvious that as the bell cranks 71 are rotated on the studs 73, and the shaft 74, the guides 69 and screens contained therein are moved to and from the plate 19, and that by using the indicator 75, and the scale 76, the approximation of the said screen to the said plate may be accurately fixed.

To operate the herein disclosed camera, the plate holder 39 is swung from its operating position, and the ground glass holder 44 is swung down to operating position. The camera lens head is then adjusted, so that the axis of the lens is fixed with reference to the position desired for the exposure on the sensitized plate. If it is desired, a diagram of the various photographic images to be imparted to the plate 19 may be made thereon, and used in the operation of setting the lens head as referred to. The curtains 49, 50, and plates 57, 58, are then arranged to fix the boundary of the image. These operations having been satisfactorily performed, the ground glass frame 44 is fitted to the upright position, while the holder 39 is swung into operating position. When the arrangement has been made, such as closing the shutter in the head, the slide 79, covering the plate 19 is removed, and the camera is ready for operating. If the photograph is to be used for half-tone work, the screen in the guides 69 is adjusted, using for that purpose the indicator 75. The exposure which is then made is through the said screen.

One exposure having been performed, the slide 79 is released, and the holder 39 is swung back to the position to permit the lowering of the ground glass holder 44. The adjustment of the parts of the camera, such as the head and the curtains 49, 50, and plates 57, 58, is effected with reference to the next succeeding exposure, and so on, until the entire surface of the plate 19, or so much thereof as is designed to be used, has been effected, after which the plate is removed for development, and the operation of the camera is continued with the succeeding plate.

If it is desired, so much of the apparatus as is contained in or attached to the frame 15 may be installed in cameras already in service, or the extension 41 and parts associated therewith may be installed on old cameras, as an adapter or attachment, the back of the frame of the old camera being removed, and the extension 41 inserted in its place.

Claims:

1. A camera as characterized, comprising a frame for holding a sensitized plate; a plurality of co-operating independent, laterally and vertically movable light obscurating members, movable in a plane juxtaposed to said plate for varying the location and size of areas of said plate to be exposed; and means operable at the outer side of said camera for adjusting said obscurating members, said means embodying rollers disposed in perpendicular relation within the camera, and indices on the frame of the camera for showing the location of said members.

2. A camera as characterized, comprising a frame for holding a sensitized plate, sets of curtains movable in a plane juxtaposed to said plate, the curtains of one of said sets being movable vertically towards and away from each other and the curtains of the other of said sets being movable horizontally towards and away from each other and across the first of said sets of curtains, the curtains of one of said sets being provided with terminal plates mounted for sliding movement, and an operating means for said curtains extending exteriorly of the camera.

3. A camera as characterized, comprising a frame for holding a sensitized plate, sets of curtains movable in a plane juxtaposed to said plate, the curtains of one of said sets being movable vertically towards and away from each other and the curtains of the other of said sets being movable horizontally towards and away from each other and across the first of said sets of curtains, terminal plates carried by the curtains of one of said sets and adapted for sliding movement within the camera, rollers carried by said terminal plates, handle elements carried by said terminal plates and projecting exteriorly of the camera, and a track element for said rollers positioned within the camera and constituting a light excluding means for the latter.

4. A camera as characterized, comprising a frame for holding a sensitized plate, sets of curtains movable in a plane juxtaposed to said plate, the curtains of one of said sets being movable vertically towards and away from each other and the curtains of the other of said sets being movable horizontally towards and away from each other and across the first of said sets of curtains, terminal plates carried by the curtains of one of said sets and adapted for sliding movement within the camera, trucks including rollers carried by said terminal plates, operating elements carried by said trucks and projecting exteriorly of the camera through a slot therein, and a track element for said rollers positioned within the camera and acting to cover the truck carrying portions of said terminal plates and the said slot whereby to exclude light from the interior of the camera.

5. A camera as characterized, comprising a frame for holding a sensitized plate, sets of curtains movable in a plane juxtaposed to said plate, the curtains of one of said sets being movable in a plane at right angles to the other and in crossed relation thereto, the curtains of the other of said sets being provided with operating means including rotatable shafts, endless elements movable when said shafts are rotated and connected with the curtains to impart movement thereto, and actuating means for said shafts extending exteriorly of the camera.

6. A camera as characterized, comprising a frame for holding a sensitized plate, sets of curtains movable in a plane juxtaposed to said plate, the curtains of one of said sets being movable in a plane at right angles to the other and in crossed relation thereto, the curtains of the other of said sets being provided with operating means including independently rotatable shafts each carrying driving sprockets and idler sprockets, sprocket chains each engaging a driving sprocket on one of said shafts and an idler sprocket on the other of said shafts, and actuating means for said shafts and sprockets extending exteriorly of the camera.

WENZEL FRITSCHE.